Sept. 5, 1967  J. C. BIRDWELL  3,339,460

PRESSURE FLUID MOTOR

Filed May 7, 1965  3 Sheets-Sheet 1

INVENTOR.
J.C. Birdwell
BY

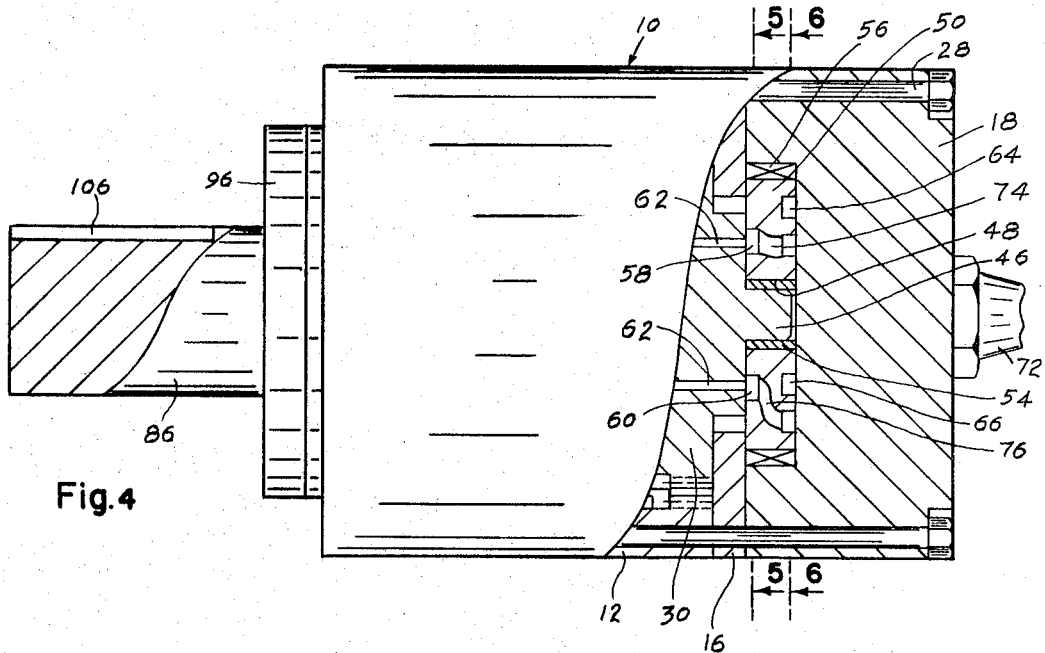
Fig. 4
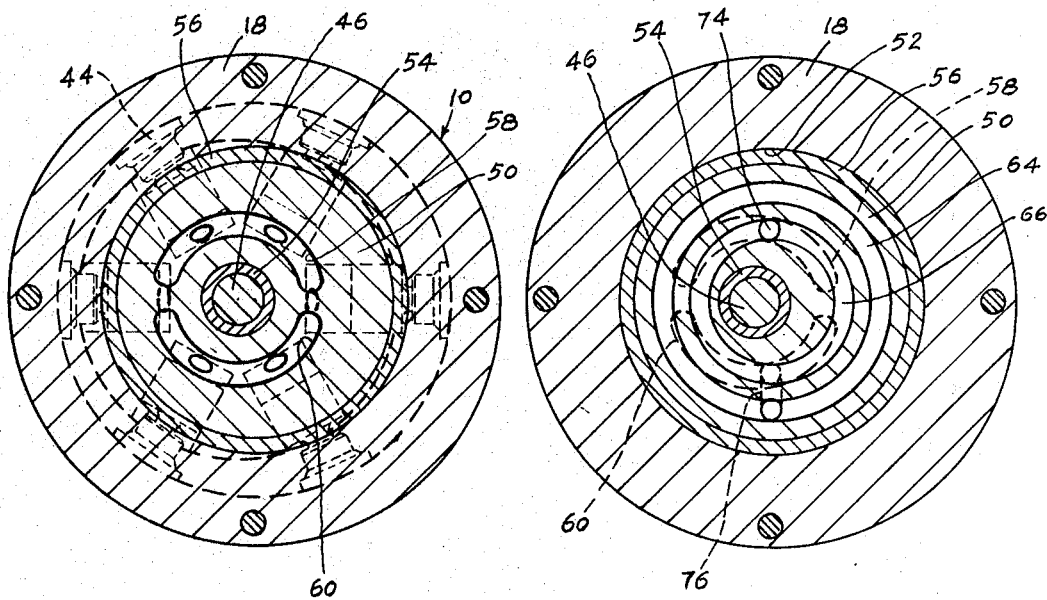
Fig. 5
Fig. 6
INVENTOR.
J.C. Birdwell

INVENTOR.
J.C. Birdwell

United States Patent Office 3,339,460
Patented Sept. 5, 1967

3,339,460
PRESSURE FLUID MOTOR
J. C. Birdwell, 8535 Glencrest, Houston, Tex. 77017
Filed May 7, 1965, Ser No. 454,120
13 Claims. (Cl. 91—56)

ABSTRACT OF THE DISCLOSURE

A pressure fluid apparatus, alternatively operable as a motor or a pump, employing a rotor mounted for rotation about its own axis and for orbital movement relative to the axis of an enclosing housing, and cylinders and associated pistons arranged between the rotor and housing to function as means for driving the rotor in response to pressure fluids acting thereon or alternatively as means driven by the rotor for pumping fluid through the cylinders.

---

This invention relates to pressure fluid apparatus and more particularly to a pressure fluid motor which may be utilized to deliver a relatively high torque at low speeds and which is also capable of use as a pump.

The invention has for an important object the provision of a fluid pressure operated motor, or the like, embodying a hollow housing or stator within which a rotor is mounted for rotation on an axis which is movable orbitally relative to the housing and having means for imparting such rotation and orbital movement to the rotor in response to the flow of pressure fluid into and out of the housing and means for transmitting such rotational or orbital movement of the rotor to an object to be rotated.

Another object of the invention is to provide a motor or pump embodying an inner rotor having peripherally-spaced, radially disposed cylinders and an outer non-rotating housing surrounding the rotor and to which pistons movably disposed in the cylinders are connected for reciprocating movement in the cylinders and for rocking movement in the cylinders and for rocking movement relative to the casing during rotation of the rotor, the rotor and casing being eccentrically arranged relative to each other to cause the rotor to rotate upon the introduction of pressure fluid into and the exhaust of the same from the cylinders.

A further object of the invention is to provide a pressure fluid motor or the like embodying an externally toothed inner rotor having peripherally spaced, radially disposed cylinders and an outer, internally toothed housing surrounding the rotor and in which the rotor is mounted for orbital movement about the axis of the housing with the teeth of the rotor and housing in intermeshing engagement during such orbital movement, and including pistons movably disposed in the cylinders and connected to the housing for reciprocating movement in the cylinders and for rocking movement relative to the housing, and means for introducing pressure fluid into and exhausting the same from the cylinders to cause the rotor to rotate.

Another object of the invention is to provide a pressure fluid motor, pump, or the like, embodying an outer housing or barrel, an inner rotor or cylinder block rotatably mounted for rotation on an axis eccentric with respect to that of the housing and having peripherally-spaced, radially disposed cylinders, pistons movably disposed in the cylinders, means connecting the pistons to the casing for reciprocating movement relative to the rotor, means for introducing pressure fluid into and exhausting the same from the cylinders to cause the rotor to rotate, a drive shaft rotatably connected to the housing and whose axis is concentric with the axis of the housing, and means forming a driving connection between the rotor and shaft to rotate the shaft in response to rotational movement of the rotor.

A further object of the invention is to provide a pressure fluid motor which is of compact and rugged construction and in which the parts are easily assembled and disassembled to facilitate maintenance and repair.

The invention also contemplates mechanism which may be used either as a speed reducing or speed increasing means in connection with fluid pressure motor or pump apparatus.

The above and other objects and advantages of the invention will be apparent from the following detailed description constituting a specification of the invention when considered with the annexed drawings, wherein:

FIGURE 4 is a view, similar to that of FIGURE 1, with the device of the invention rotated 90° about its longitudinal axis from the position illustrated in FIGURE 1 and showing details of structure of the pressure fluid distributing mechanism of the invention;

FIGURE 5 is a cross-sectional view, taken along the line 5—5 of FIGURE 4, looking in the direction indicated by the arrows;

FIGURE 6 is a cross-sectional view, taken along the line 6—6 of FIGURE 4, looking in the direction indicated by the arrows;

Figure 1:
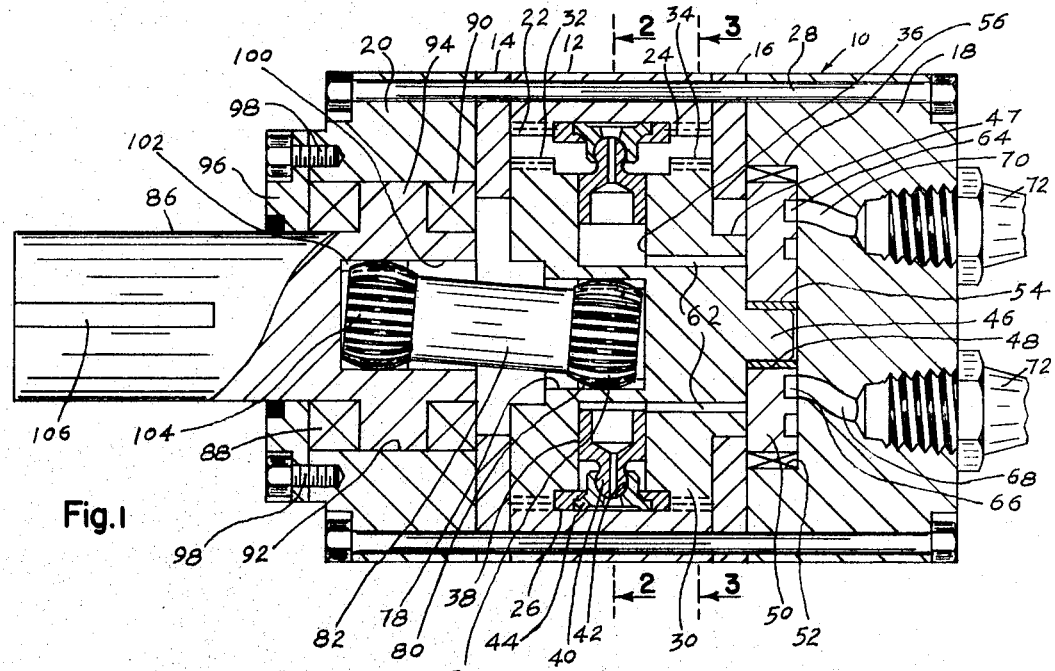
FIGURE 1 is a side view, partly broken away and partly in longitudinal, central, cross-section, illustrating a preferred embodiment of the invention.
Figures 2, 3:
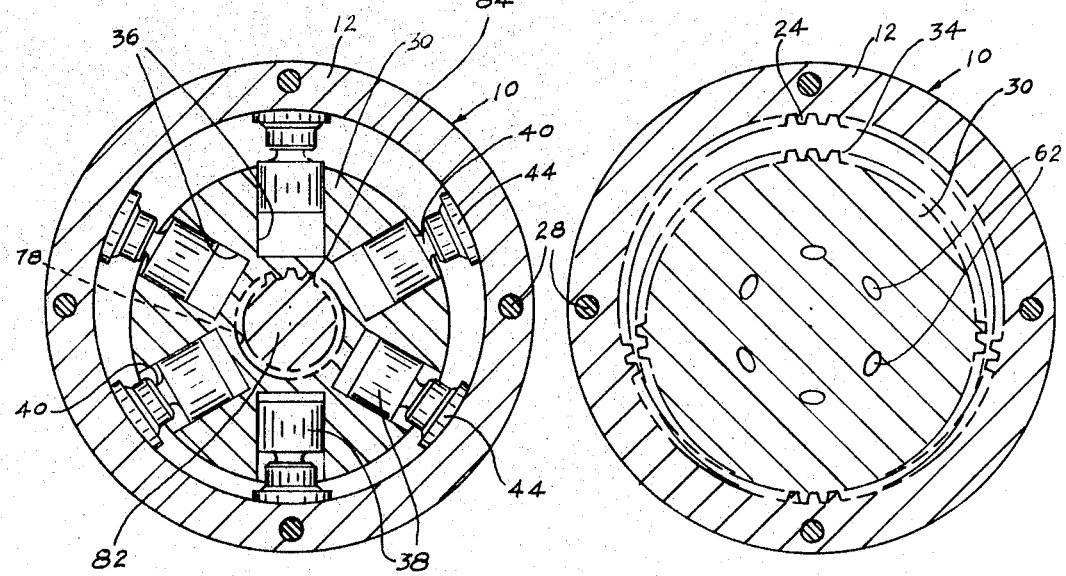
FIGURE 2 is a cross-sectional view, taken along the line 2—2 of FIGURE 1, looking in the direction indicated by the arrows.
FIGURE 3 is a cross-sectional view, taken along the line 3—3 of FIGURE 1, looking in the direction indicated by the arrows.

Referring now to the drawings in greater detail, the invention as illustrated in FIGURE 1 to 6 of the drawings comprises a housing, generally designated 10, which in the present instance is of cylindrical shape, made up of a centrally disposed annular member 12, also called a piston shoe plate, annular end plates 14 and 16, disposed at the ends of the members 12, a valve head or block 18, positioned with one side face in engagement with the adjacent side face of the end plate 16 and an annular shaft-mounting plate 20 disposed with one side face thereof in engagement with the adjacent side face of the end plate 14.

The annular member 12 is formed with longitudinally spaced apart sets of internal gear teeth 22 and 24 extending about its internal periphery and between which a piston shoe retainer ring 26 is disposed.

The member 12, end plates 14 and 16, head 18 and shaft mounting plate 20 are suitably perforated to receive securing means, such as the bolts 28 extended therethrough whereby the parts of the housing are secured in assembled relation as shown in FIGURE 1.

Within the housing, constructed as described above, a rotor 30 is positioned for rotation between the end plates 14 and 16, which rotor is of substantially smaller external diameter than the internal diameter of the piston shoe plate 12, and is provided with spaced apart sets of external teeth 32 and 34 for intermeshing engagement with the internal teeth 22 and 24, respectively, of the shoe plate. The rotor 30 has radially disposed, outwardly opening, recesses 36 disposed at uniformly peripherally spaced intervals about its axis, forming cylinders in which pistons 38 are movably disposed.

Each of the pistons 38 is formed at its outer end with a central, longitudinally extending lug 40 whose outer end is of ball shape to fit into the socket 42 of a piston shoe 44, which is slidably received in shoe retainer ring 26, carried by the shoe plate 12 to form a ball and socket connection between the piston and plate to allow rocking movement of the piston relative to the shoe as the rotor rotates the piston shoes 44 rotating with the rotor and sliding in retainer ring 26.

The rotor 30 has a central bearing lug 46 extending longitudinally therefrom, which is extended into an off-center opening 48 in a valve element or plate 50, rotatably mounted in a central recess 52 in the valve block 18. Suitable bearing means, such as the bushing 54 is provided for the bearing lug 46 in the opening 48, and the valve plate 50 is also rotatably supported in the recess 52 by suitable bearing means of usual construction indicated at 56. The rotor 30, also has a portion 47, which extends into the central opening of the annular end plate 16 in eccentric relation thereto, and whose diameter is substantially smaller than the internal diameter of the end plate.

It will be apparent that due to the off-center or eccentric positioning of the bearing lug 46 of the rotor 30 in the valve plate 50, the rotor will be caused to move orbitally about the interior of the shoe plate 12 with the teeth 32, 34 of the rotor in intermeshing engagement with the internal teeth 22, 24 respectively, of the shoe plate, so that the rotor will rotate on its axis during such orbital movement.

The valve plate 50 is provided with concentric, arcuate recesses 58 and 60 in its inner face, which recesses are nearly semi-circular with their adjacent ends somewhat spaced apart, and the rotor 30 has a passageway 62 for each of the cylinders 36, whose inner end opens into the cylinder inwardly of the piston 38 therein and whose outer end is positioned to be in communication with the arcuate recess 58 during one portion of the rotational movement of the rotor and with the recess 60 during another portion of such movement.

The valve plate 50, also has in its outer face concentric, annular, radially spaced grooves 64 and 66, of which the outer groove 64 is in communication with the inner end of a passageway 70 in the valve block 18, while the inner groove 66 is in communication with the inner end of a passageway 68 in the valve block. The valve block 18 is provided with suitable fittings 72, threadably connected thereto in communication with the outer ends of the passageways 68 and 70 by which these passageways may be connected in communication with pressure fluid supply and exhaust lines under the control of a suitable control valve mechanism, not shown, whereby fluid under pressure may be introduced into either of the passageways 68 and 70 while permitting the outflow of such fluid through the other of the passageways, depending upon the direction in which it is desired to have the rotor 30 rotate. The inner groove 66 is in communication with the arcuate recess 58 through a passageway 74 in the valve plate 50 and the outer groove 64 communicates with the arcuate recess 60 through a passageway 76.

The rotor 30 is also formed with a centered recess 78 which is internally toothed, as shown at 80 in FIGURE 1, and into which a wobble shaft 82 is extended at its inner end. The wobble shaft 82 is provided at its inner end with an external, rounded, externally toothed enlargement 84 whose teeth are in intermeshing engagement with the internal teeth 80 of the rotor.

A shaft 86 is rotatably mounted on the housing 10, as by means of suitable bearings 88 and 90 positioned within the opening 92 of the mounting plate 20 on each side of an external enlargement 94 of the shaft. A retainer plate 96 surrounds the shaft 86 externally of the mounting plate, and is suitably secured to the mounting plate as by means of screws 98. The shaft 86 has at its inner end a central end recess 100 which is internally toothed, as shown at 102, and into which the outer end of the wobble shaft 82 is extended, the wobble shaft being provided at its outer end with a rounded, externally toothed enlargement 104 whose teeth are in intermeshing engagement with the internal teeth 102 of the shaft 86. Between the end enlargements 84 and 104, the wobble shaft is of smaller diameter than the recesses 78 and 100, so that the wobble shaft may wobble freely during rotation of the parts to transmit rotational motion of the rotor to the shaft 86.

Shaft 86 may be splined or keyed as seen at 106 for attachment to any desired member to be rotated, or by which the shaft is to be turned. The shaft 86 may serve as either a rotatably mounted driven member or as a driving member.

In the operation of the invention, constructed as described above, pressure fluid, such as hydraulic fluid, from a suitable source is supplied to the apparatus through the passageway 68, for example, while allowing the exhaust of such fluid therefrom through the other passageway. The pressure fluid applied through passageway 68 flows into the inner groove 66 from whence it may flow successively into the cylinders 36, through passageways 62, as the rotor rotates to move the passageways 62 into communication at their outer ends with the inner groove, exhaust of pressure fluid from the cylinders taking place successively, through others of the passageways 62, into the outer annular groove 64, from whence the fluid may flow through passageway 70 to exhaust. Pressure fluid is thus supplied to some of the cylinders while exhausting the same from others of the cylinders, as the passageways 62 are successively brought into communication with the grooves 64 and 66 to cause the rotor to rotate in the housing.

During rotation of the rotor in the housing the valve plate 50 will be rotated with the rotor, to move the ports 58 and 60 in a manner to successively bring the ports into and out of communication with the passageways 62, while the rotor moves orbitally about the interior of the housing, with the external teeth 32 and 34 of the rotor in intermeshing engagement with the internal teeth 22 and 24 of the annular member 12. Such rotational and orbital movement of the rotor is transmitted to the shaft or rotatably mounted member 86 through the wobble shaft 82, to rotate the shaft or member 86.

It will be evident that by reversing the flow of pressure fluid through the apparatus, as by introducing pressure fluid through the passageway 70, while exhausting the same through the passageway 68, the operation of the motor may be reversed.

Moreover, by opening the passageways 68 and 70 to the flow of hydraulic fluid through the system, the apparatus may be operated as a pump by rotating the shaft 86, to turn the rotor 30, thus actuating the pistons 38 to circulate the hydraulic fluid through the system.

Figure 7:
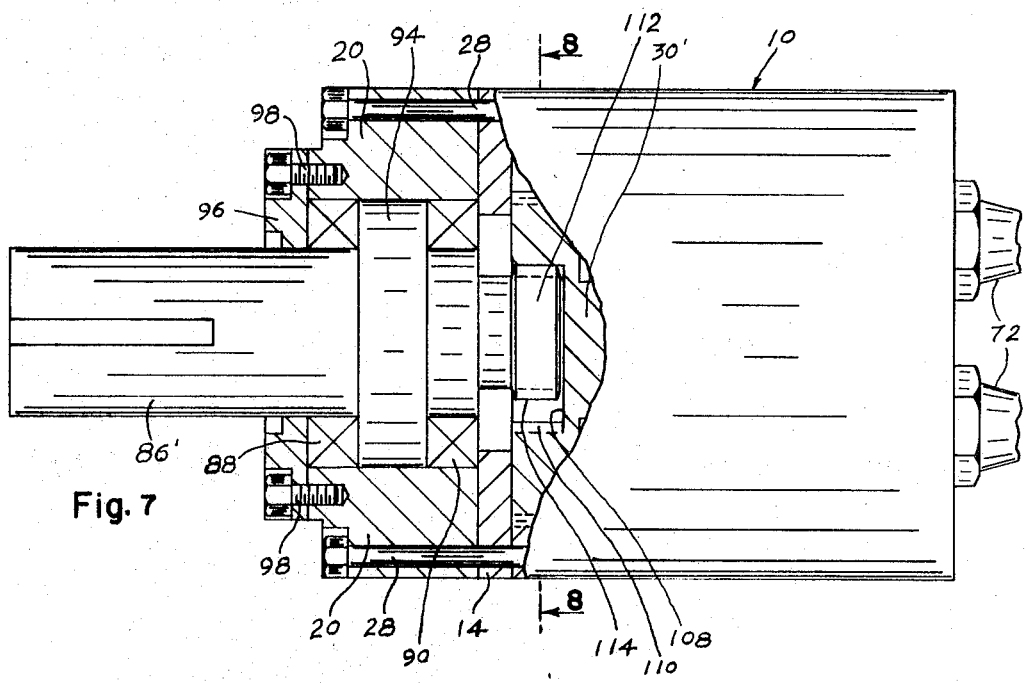
FIGURE 7 is a view similar to that of FIGURE 1, illustrating a somewhat modified form of the invention.
Figure 8:
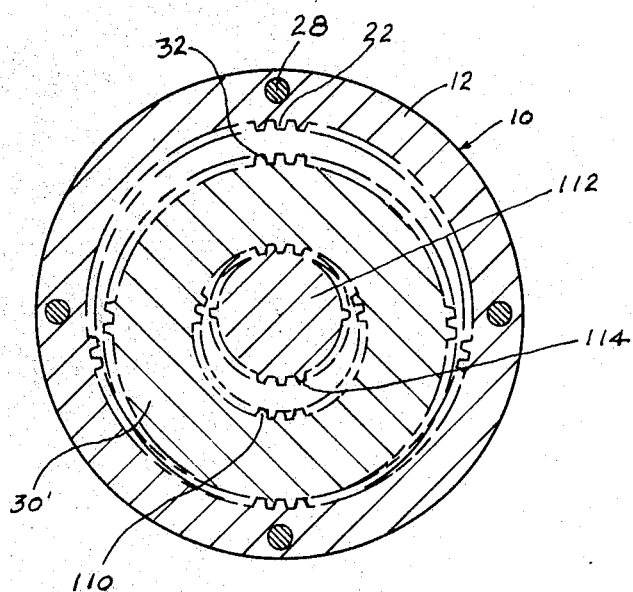
FIGURE 8 is a cross-sectional view, taken along the line 8—8 of FIGURE 7, looking in the direction indicated by the arrows.

A somewhat modified form of the invention is illustrated in FIGURES 7 and 8, wherein the arrangement of the housing and rotor and the cylinders, pistons and passageways is the same as that previously described in connection with the form of the invention illustrated in FIGURES 1 to 6, inclusive.

In this modified form of the invention, however, the wobble shaft 82 is replaced by gear mechanism, for transmitting the rotational motion of the rotor to the shaft or member 86', the rotor 30' in this form of the invention having a centered end recess 108, which is internally toothed, as shown at 110, and the shaft 86', having a central, annular, end extension 112, which is externally toothed, as shown at 114, and which is extended inwardly into the recess 108, for intermeshing engagement of the teeth 114 with the internal teeth 110, whereby rotation of the rotor is transmitted to the shaft or member 86'.

In other respects this form of the invention is the same as that previously described, and is operated in the same manner. Thus, upon the introduction of pressure fluid through one of the fittings 72, while exhausting such fluid through the other of the fittings, the rotor 30' is caused to rotate and to move orbitally about the interior of the housing, rotational movement of the rotor being transmitted through the gears 110 and 114 to the shaft 86'. The motor of figures 7 and 8 may also be operated as a pump by rotating the shaft 86' while allowing circulation of hydraulic fluid through the apparatus as previously described.

It will be apparent that each time that the valve plate 50 makes one revolution and rotor 30 makes one orbit, the rotor will rotate a limited number of degrees, less than one revolution. The amount of rotational movement of the rotor during each revolution of the valve plate will depend upon the gear ratio between the internal gear teeth 22, 24 of the housing and the external gear teeth 32, 34 of the rotor. Thus, for example, when the housing has 30 internal gear teeth and the rotor is provided with 24 external gear teeth, the rotor will rotate six teeth, or one-fourth revolution for each revolution of the valve plate. Each of the cylinders 36 will have one power stroke for each revolution of the valve plate, so that, in the above example, there will be four power strokes of each piston for each revolution of the rotor, thus producing a relative high torque at low operating speed of the motor.

Due to the gear ratio between external teeth 114 of the shaft 86' and the internal teeth 110 of the rotor 30' the shaft 86' will rotate more than one revolution for each revolution of the rotor. Thus, for example, if the gear 114 has 10 teeth and the internal gear 110 has 20 teeth, the shaft 86' will be rotated 2⅗ revolutions for each complete orbital revolution of the rotor 30' in the housing, thus providing for relatively high speed operation of the shaft.

It will thus be seen that the invention constructed and operated as described above, provides pressure fluid operated mechanism which may be used as a motor, or as a pump, and which may also be used either as a speed reducing or a speed increasing device.

It will be evident that, if desired, the pistons may be mounted in the housing to act on the rotor, rather than in the opposite arrangement heretofore described in detail. The principal functional characteristics will be the same in either case, and the necessary mechanical rearrangement will be obvious to those skilled in the art.

The invention is disclosed herein in connection with certain specific embodiments of the same, which it will be understood are intended by way of example only, it being obvious that various changes can be made in the construction and arrangement of the parts, within the spirit of the invention and the scope of the appended claims.

Having thus clearly shown and described the invention, what is claimed as new and desired to secure by Letters Patent is:

1. Pressure fluid apparatus comprising, a housing, a rotor in the housing, means mounting the rotor for rotation of an axis disposed eccentrically relative to and for orbital movement about the axis of the housing, gear means on the rotor and housing positioned for coaction to cause the rotor to rotate during such orbital movement, peripherally spaced, radially disposed cylinders formed in the rotor, pistons movably disposed in the cylinders for reciprocating movement therein, means forming a connection between each piston and the housing to cause the rotor to rotate upon reciprocation of the pistons, a member rotatably mounted on the housing for rotation in concentric relation to the axis of the housing and means forming a driving connection between said rotor and member to cause the member and rotor to rotate simultaneously.

2. Pressure fluid apparatus comprising, an internally toothed housing, an externally toothed rotor in the housing, means mounting the rotor for rotation on an axis disposed eccentrically of and for orbital movement relative to the axis of the housing in meshing engagement therewith, peripherally spaced, radially disposed cylinders formed in the rotor, pistons movably disposed in the cylinders for reciprocating movement therein, means forming a connection between each piston and the housing to cause the rotor to rotate upon reciprocation of the pistons, and means for introducing pressure fluid into and exhausting the same from the cylinders to cause the pistons to reciprocate.

3. Pressure fluid apparatus comprising, an internally toothed housing, an externally toothed rotor in the housing, means mounting the rotor for rotation on an axis disposed eccentrically of and for orbital movement relative to the axis of the housing in meshing engagement therewith, peripherally spaced, radially disposed cylinders formed in the rotor, pistons movably disposed in the cylinders for reciprocating movement therein, means forming a movable connection between each piston and said housing to move concentrically relative to the housing to cause the rotor to move orbitally upon relative reciprocating movement of the pistons and cylinders, and means for introducing pressure fluid into and exhausting the same from the cylinders to cause such relative reciprocation.

4. Pressure fluid apparatus comprising, a housing, a rotor in the housing, means mounting the motor for rotation on an axis disposed eccentrically of and for orbital movement about the axis of the housing, gear means on the housing and rotor positioned for coaction to impart rotation to the rotor during such orbital movement, peripherally spaced, radially disposed cylinders formed in the rotor, pistons movably disposed in the cylinders for reciprocating movement therein, means forming a connection between each piston and the housing to impart such orbital movement to the rotor upon reciprocation of the pistons, and means for introducing pressure fluid into and exhausting the same from the cylinders to cause the pistons to reciprocate.

5. Pressure fluid apparatus comprising, a housing, a rotor in the housing, means mounting the rotor for rotation on an axis disposed eccentrically of and for orbital movement about the axis of the housing, gear means on the housing and rotor positioned for coaction to impart rotation to the rotor during such orbital movement, peripherally spaced, radially disposed cylinders formed in the rotor, pistons movably disposed in the cylinders for reciprocating movement therein, means forming a connection between each piston and the housing to impart such orbital movement to the rotor upon reciprocation of the pistons, and means responsive to the rotational movement of said rotor for successively introducing fluid under pressure into and exhausting the same from said cylinders to cause the pistons to reciprocate.

6. Pressure fluid apparatus comprising, a housing, a rotor in the housing, means mounting the rotor for rotation on an axis disposed eccentrically of and for orbital movement about the axis of the housing, gear means on the housing and rotor positioned for coaction to impart rotation to the rotor during such orbital movement, peripherally spaced, radially disposed cylinders formed in the rotor, pistons movably disposed in the cylinders for reciprocating movement therein, means forming a connection between each piston and the housing to impart such orbital movement to the rotor upon reciprocation of the pistons, said rotor having a passageway for each cylinder through which fluid may flow into and out of the cylinder at a location radially inwardly of the piston therein, and valve means movably positioned in the housing for movement in response to rotation of said rotor to control the inflow and outflow of pressure fluid through said passageways to cause the pistons to reciprocate.

7. Pressure fluid apparatus comprising, a housing, a rotor in the housing, means mounting the rotor for rotation on an axis disposed eccentrically relative to and for orbital movement about the axis of the housing, gear means on the rotor and housing positioned for coaction to cause the rotor to rotate during such orbital movement, peripherally spaced, radially disposed cylinders formed in the rotor, pistons movably disposed in the cylinders for reciprocating movement therein, means forming a connection between each piston and the housing to cause the rotor to rotate upon reciprocation of the pistons, a member rotatably mounted on the housing for concentric rotation about the axis of the housing, a wobble shaft in the housing, means forming a driving connection between one end of the wobble shaft and said rotor to cause said one end to move orbitally and rotate with the rotor and means forming a driving connection between the other end of said wobble shaft and said member to rotate the member in response to rotation of the wobble shaft.

8. Pressure fluid apparatus comprising, a housing, a rotor in the housing, means mounting the rotor for rotation on an axis disposed eccentrically relative to and for orbital movement about the axis of the housing, gear means on the rotor and housing positioned for coaction to cause the rotor to rotate during such orbital movement, peripherally spaced, radially disposed cylinders formed in the rotor, pistons movably disposed in the cylinders for reciprocating movement therein, means forming a connection between each piston and the housing to cause the rotor to rotate upon reciprocation of the pistons, a member rotatably mounted on the housing for concentric rotation about the axis of the housing, internal gear teeth formed on said rotor in concentric relation to the axis of the rotor, and external gear teeth on said member in meshing engagement with said internal teeth to cause said member to rotate with said rotor.

9. Pressure fluid apparatus comprising a housing, a rotor in the housing, means mounting the rotor for orbital movement about the axis of the housing, a member rotatably mounted on the housing for concentric rotation about the axis of the housing, means forming a driving connection between the rotor and said member to cause said member to rotate as said rotor orbits, peripherally spaced, radially disposed cylinders formed in the rotor, pistons movably disposed in the cylinders for reciprocating movement therein, means forming a connection between each piston and the housing to impart such orbital movement to the rotor upon reciprocation of the pistons, said rotor having a passageway for each cylinder through which fluid may flow into and out of the cylinder at a location radially inwardly of the piston therein, and valve mens movably positioned in the housing for movement in response to rotation of said rotor to control the inflow and outflow of pressure fluid through said passageways to cause the pistons to reciprocate.

10. Pressure fluid apparatus comprising a housing, a rotor in the housing, means mounting the rotor for rotation on an axis disposed eccentrically of and for orbital movement about the axis of the housing, a member rotatably mounted on the housing for concentric rotation about the axis of the housing, means forming a driving connection between the rotor and said member to cause said member to rotate as said rotor orbits and rotates, peripherally spaced, radially disposed cylinders formed in the rotor, pistons movably disposed in the cylinders for reciprocating movement therein, means forming a connection between each piston and the housing to impart such orbital movement to the rotor upon reciprocation of the pistons, said rotor having a passageway for each cylinder through which fluid may flow into and out of the cylinder at a location radially inwardly of the pistons therein, and valve means movably positioned in the housing for movement in response to rotation of said rotor to control the inflow and outflow of pressure fluid through said passageways to cause the pistons to reciprocate.

11. Pressure fluid apparatus comprising, a housing, a rotor in the housing, means mounting the rotor for rotation on an axis disposed eccentrically of and for orbital movement relative to the axis of the housing and in engagement therewith, peripherally spaced radially disposed cylinders arranged between the housing and the rotor, pistons movably disposed in the cylinders for reciprocating movement therein, means carried by the pistons forming driving connections between the rotor and the housing to cause the rotor to rotate upon reciprocation of the pistons, and means for introducing pressure fluid into and exhausting the same from the cylinders to cause the pistons to reciprocate.

12. Pressure fluid apparatus comprising, a housing, a rotor in the housing, means mounting the rotor for rotation on an axis disposed eccentrically of and for orbital movement relative to the axis of the housing and in engagement therewith, peripherally spaced, radially disposed cylinders arranged between the housing and the rotor, pistons reciprocable in the cylinders, means carried by the pistons forming driving connections between the rotor and housing, said last mentioned means being alternatively operable to cause the rotor to rotate upon reciprocation of the pistons and to cause the pistons to reciprocate in response to rotation of the rotor, and means for introducing fluid into and exhausting the same from the cylinders.

13. Pressure fluid apparatus comprising, a housing, a rotor in the housing, means mounting the rotor for rotation on an axis disposed eccentrically of and for orbital movement relative to the axis of the housing and in engagement therewith, peripherally spaced, radially disposed cylinders arranged between the housing and rotor, pistons reciprocable in the cylinders, means carried by the pistons forming driving connections between the rotor and the housing to cause the pistons to reciprocate in response to rotation of the rotor, means for rotating the rotor, and means for introducing fluid into and exhausting the same from the cylinders upon reciprocation of the pistons.

References Cited

UNITED STATES PATENTS

| | | | |
|---|---|---|---|
| 852,301 | 4/1907 | Sharpneck | 91—202 X |
| 2,989,951 | 6/1961 | Charlson | 103—130 X |
| 3,030,932 | 4/1962 | Muller | 91—56 |
| 3,215,043 | 11/1965 | Huber | 91—56 |
| 3,233,524 | 2/1966 | Charlson | 91—56 |

FOREIGN PATENTS 558,771   1/1944   Great Britain.

MARTIN P. SCHWADRON, *Primary Examiner.*

G. N. BAUM, *Assistant Examiner.*